United States Patent [19]
Marshall

[11] Patent Number: 5,396,927
[45] Date of Patent: Mar. 14, 1995

[54] COUPLINGS

[75] Inventor: Francis Marshall, Dorset, United Kingdom

[73] Assignee: Flight Refuelling Limited, Wimborne, United Kingdom

[21] Appl. No.: 211,109

[22] PCT Filed: Sep. 25, 1992

[86] PCT No.: PCT/EP92/02242

§ 371 Date: Mar. 21, 1994

§ 102(e) Date: Mar. 21, 1994

[87] PCT Pub. No.: WO94/05526

PCT Pub. Date: Mar. 17, 1994

[30] Foreign Application Priority Data

Sep. 26, 1991 [GB] United Kingdom ............... 9120460

[51] Int. Cl.6 ........................................... F16L 37/28
[52] U.S. Cl. ............................ 137/614.06; 251/356
[58] Field of Search ............... 137/614, 614.03, 614.05, 137/614.06, 614.04, 614.01, 614.02; 251/356, 359

[56] References Cited

U.S. PATENT DOCUMENTS

| | | | |
|---|---|---|---|
| 2,709,093 | 5/1955 | Zeeb | 137/614.03 X |
| 3,994,317 | 11/1976 | Miyazaki et al. | 137/614.03 |
| 4,030,524 | 6/1977 | McMath et al. | 137/614.06 |
| 4,089,341 | 5/1978 | Okaya | 137/614 X |
| 4,373,551 | 2/1983 | Shindelar | 137/614.06 |
| 5,273,071 | 12/1993 | Oberrecht | 137/614.06 |

FOREIGN PATENT DOCUMENTS

| | | |
|---|---|---|
| 0251091 | 6/1987 | European Pat. Off. . |
| 780846 | 12/1934 | France . |
| 3224852 | 1/1984 | Germany . |
| 1218941 | 1/1971 | United Kingdom . |

Primary Examiner—Martin P. Schwadron
Assistant Examiner—Kevin L. Lee
Attorney, Agent, or Firm—David L. Davis

[57] ABSTRACT

A self-sealing coupling comprising two coupling parts each having an obturating member which seals automatically when the coupling parts are disconnected, and a ring seal which mates in a fluid tight manner with the corresponding ring seal of the other coupling part when the coupling is engaged. One of the obturating members has a conical elastomeric face seal which is relaxed when the coupling is made and the two obturating members are displaced to one side of the mating ring seals for fluid flow. A tapering annular clearance is formed between the faces of the obturating members when the elastomeric face seal is in a natural relaxed state. The arrangement is such that the conical face seal is flattened by the thrust that reseats the two obturating members so that the tapering annular clearance between it and the flat face of the other obturating member is taken up and fluid between the obturating members is squeezed out to a location upstream of the ring seals.

20 Claims, 4 Drawing Sheets

COUPLINGS

DESCRIPTION

This invention relates to a coupling for connecting together two fluid passages and through which fluid is to be transferred from one of the passages to the other, the coupling being of the kind which comprises two coupling parts, each of which forms a respective one of the two fluid passages and is provided with an obturating member operable to close the respective fluid passage automatically, in a fluid tight manner, when the respective coupling part is disconnected from a mating coupling part, and actuating means operable to effect decoupling and fluid tight coupling of the two coupling parts and to apply a thrust to said obturating members during coupling so that the obturating members are displaced from their positions in which they close the respective through passages to allow fluid flow around the displaced obturating members from one passage to the other, and to return the obturating members to said positions for decoupling. GB-A-1218941 discloses such a coupling.

An object of the invention is to provide a sealing arrangement for a coupling of the kind referred to above which allows the coupling to be readily decoupled and which enables substantial elimination from the interfaces of the coupling and its sealing arrangement, prior to separation of the coupling parts, of any residual traces of the fluid product that is transferred from one of the fluid passages to the other, so that the coupling is suitable for use for the transfer of light petroleum products or other volatile or noxious fluids.

According to this invention there is provided a coupling of the kind referred to above wherein one of the obturating members has a face which is adjacent to a corresponding face of the other obturating member as those obturating members are displaced from said positions by said actuating means when the coupling parts are coupled together, said face of said one obturating member being formed of an elastomeric material and being profiled in its natural relaxed state such that, when it touches the adjacent face of the other obturating member without deformation of the elastomeric material, a radially extending tapering clearance is formed between those faces, said actuating means being adapted to apply an axial thrust through one of the obturating members to the other whereby the elastomeric material is compressed so that the clearance is taken up and fluid between those faces is squeezed out as the obturating members return to said positions prior to disconnection of the coupling parts, the elastomeric material of said one obturating member being in its natural relaxed state when the coupling parts have been coupled together and the obturating members have been displaced by said actuating means to rest positions which they occupy as fluid is transferred around them from one of the through passages to the other.

In a preferred embodiment, the coupling comprises a pair of ring seals on a peripheral joint of the coupling parts and a pair of disc seals on the adjacent faces of the obturating members. Preferably the profiles of these seals are so arranged that, in the purging sequence of the seal operation during which the profiled elastomeric material of one of the disc seals is deformed to squeeze out fluid from between the adjacent faces of the disc seals, annular clearances between the obturating members and the ring seals are progressivly closed forcing any such residual fluid back past one of the two disc seals and into one of the two through passages before seating of the disc seals is completed prior to disconnection of the coupling.

One embodiment of this invention will be described now by way of example with reference to the accompanying drawings which are sectional views through a sealing arrangement of a fluid coupling at various stages of its operation:

Figure 1:
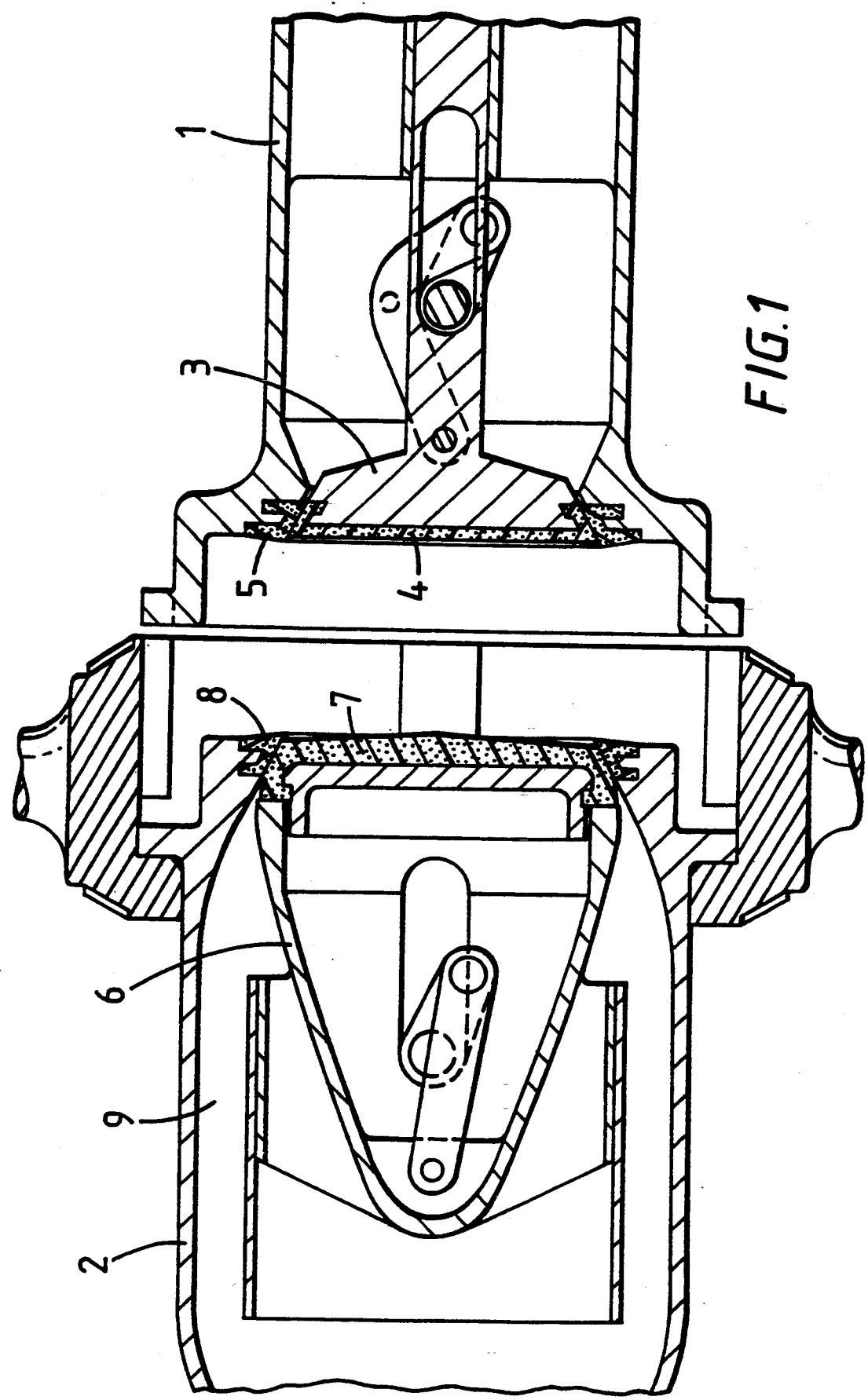
FIG. 1 shows the coupling disconnected with obturating members sealing respective coupling parts.

For convenience we describe the initial coupling of the coupling parts although the prime objective of the invention is concerned with the subsequent decoupling process.

Part of the coupling is provided with actuating means. For convenience that part is described as the tank connection and the other part of the coupling, which is detachable, is described as the hose connection, although the disposition of the coupling parts could be reversed, or the hose connection could embody the same obturating mechanism as is described for the tank connection.

The drawings show a two part coupling comprising a hose connection part 1, for fixing to a hose, not shown, and a tank connection part 2, for fixing to a tank installation, not shown. Each coupling part 1,2 forms a respective fluid passage and is provided with a respective obturating member 3,6 which is operable to close the respective fluid passage. Each obturating member 3,6 has a face seal 4,7 which cooperates with the face seal 4,7 of the other obturating member 3,6 when the coupling is engaged. Each coupling part 1,2 has a ring seal 5,8 on its peripheral surface which surrounds an end of the respective through passage and which cooperates with the ring seal 5,8 of the other coupling part 1,2 when the coupling is engaged. The radially inner surfaces of the two ring seals 5 and 8 both taper towards the hose connection part 1, and each of them provides a seat for the radially outer portion of the face seal 4,7 of the respective obturating member 4,6. Hence the diameter of the hose connection obturating member 3 is less than the diameter of the tank connection obturating member 6. Also the hose connection obturating member 3 can pass through the tank connection ring seal 8 which has a larger diameter than the hose connection ring seal 5. For reasons which are explained below, the angle of taper of the radially outer portion of each of the face seals 4 and 7 that is to seat in the respective ring seal 5,8 is less than the angle of taper of the respective ring seal 5,8 when the material of the seals is in its natural relaxed state.

FIG. 1 shows the coupling in the disconnected condition. The hose connection obturating member 3 and its face seal 4, are retracted and in pressure tight contact with the tapered inner circumference of the hose connection ring seal 5. The tank connection obturating member 6, and its face seal 7, are in pressure tight contact with the tapered inner circumference of the tank connection ring seal 8. The hose connection face seal 4 has a flat face. The tank connection face seal 7 has a convex or conical face. The profiles of the hose ring seal 5 and tank ring seal 8 protrude so that, upon engagement of the coupling, they will come into pressure tight contact before the obturating member seals 4 and 7 contact.

The ring seals 5 and 8 and the face seals 4 and 7 are formed of elastomeric material.

Figure 2:
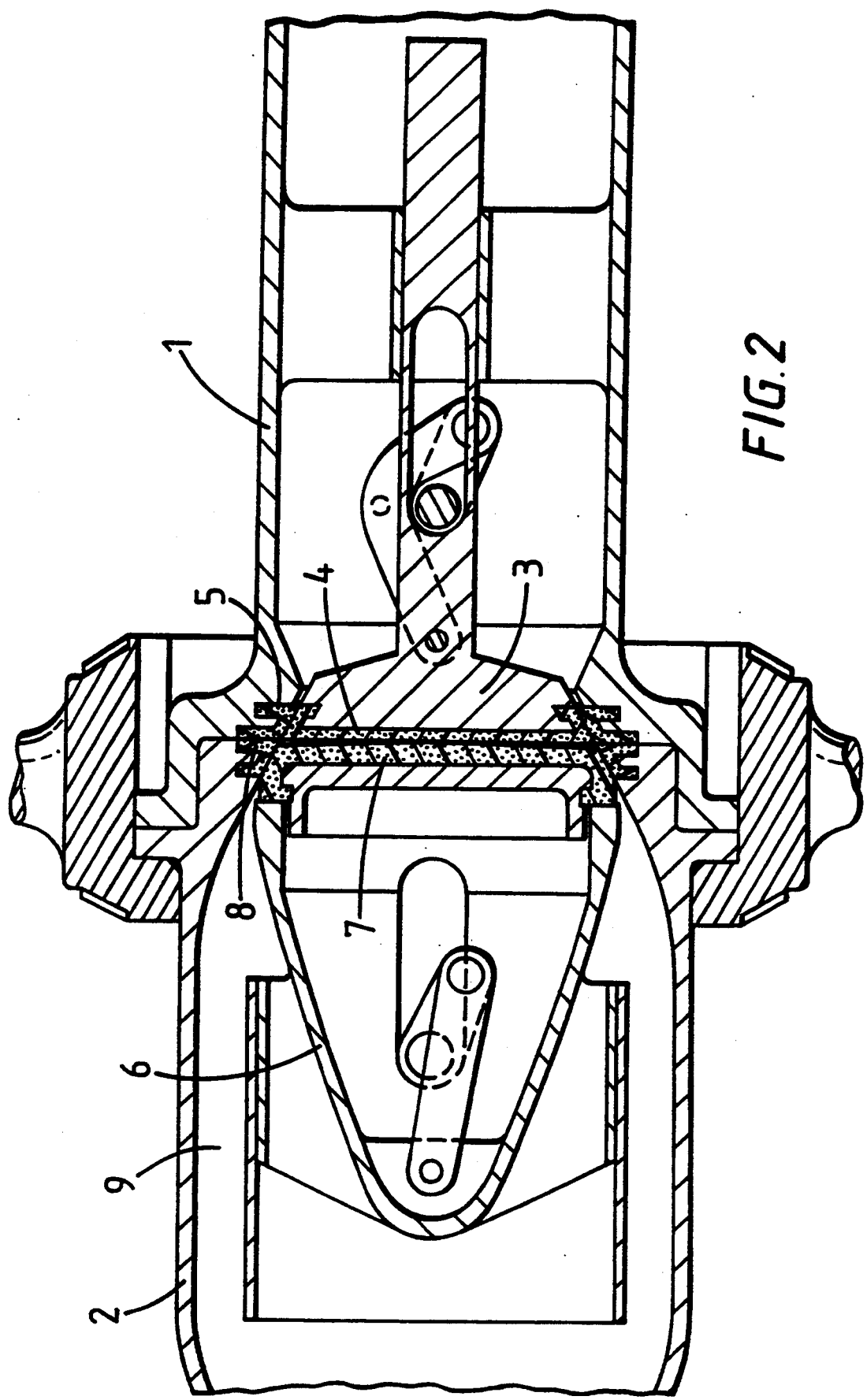
FIG. 2 shows the coupling connected with ring seals compressed prior to compression of obturating member face seals.

FIG. 2 shows the coupling in the first stage of engagement, the coupling parts being locked together by a convenient means such as a bayonet and cam device. The hose connection ring seal 5 is in pressure tight contact with the tank connection ring seal 8. The hose connection obturating member face seal 4 is just touching the tank connection face seal 7. The convex, or conical, face of the tank connection obturating seal 7 forms an outwardly divergent tapering cavity with the flat face of the hose connection seal 4.

Figure 3:
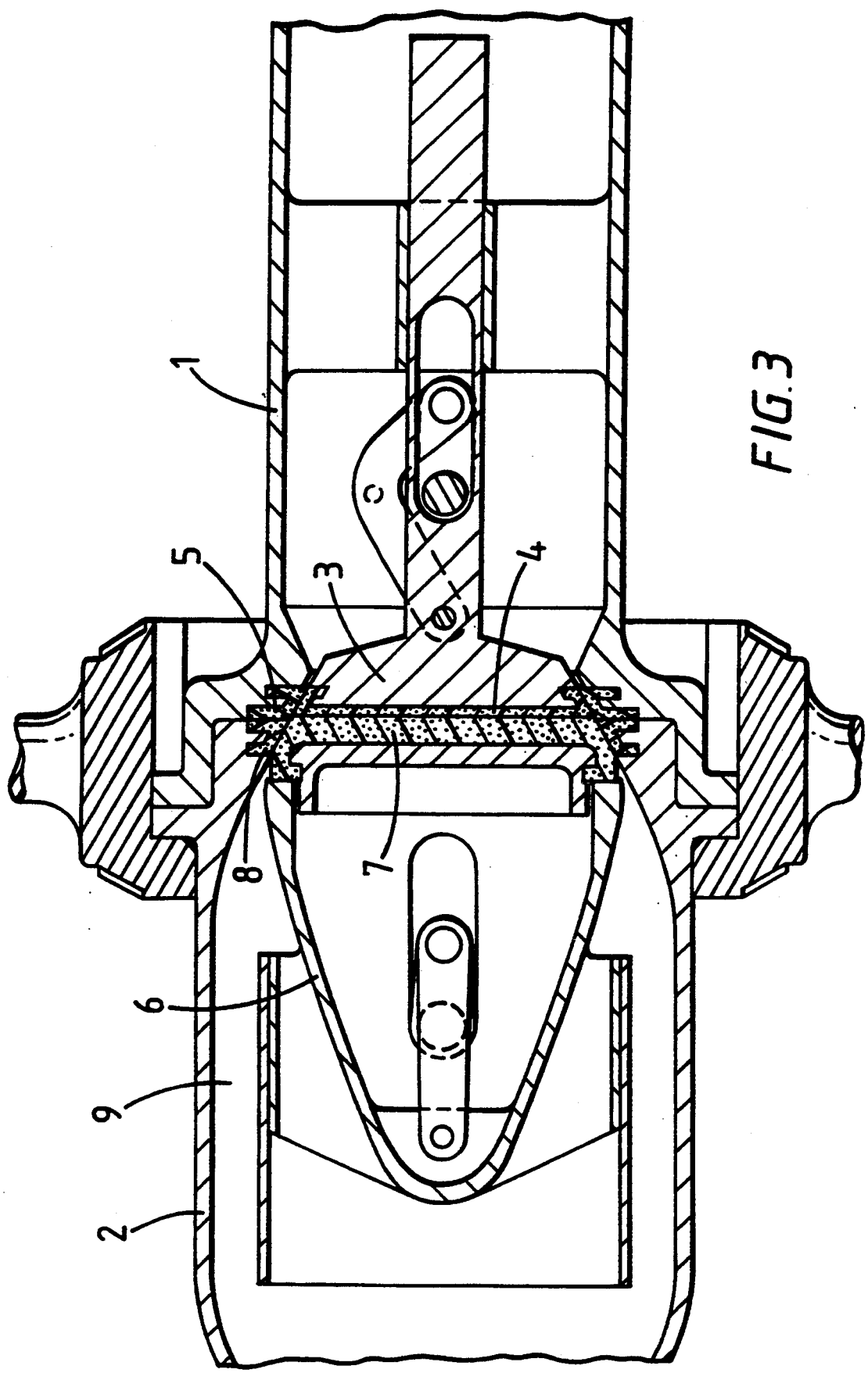
FIG. 3 shows the ring seals compressed and the obturating member face seals compressed to the point of opening of the obturating members.

FIG. 3 shows the coupling in the second stage of engagement. The coupling actuating means, shown as externally synchronised over-centre toggle devices in each coupling part 1 and 2, drives the tank connection obturating member face seal 7 into hard contact with the hose connection obturating member face seal 4, deforming the elastomeric material of the face seal 7 in so doing. Differing movements of the toggle devices allow the tank connection obturating member face seal 7 to compress against the hose connection obturating member face seal 4 progressively closing the radially tapering clearance across the obturating member faces 4 and 8. The geometry of the coupling is arranged so that the pressure between the ring seals 5 and 8 is greater than the pressure between the tank connection face seal 7 and the tank connection ring seal 8. Also the pressure between the obturating member face seals 4 and 7 is greater than the tank line pressure. Hence any trapped fluid between the obturating member face seals 4 and 7 will be forced past the tank connection obturating member face seal 7 and the tank connection ring seal 8 into the tank connection fluid chamber 9.

Figure 4:
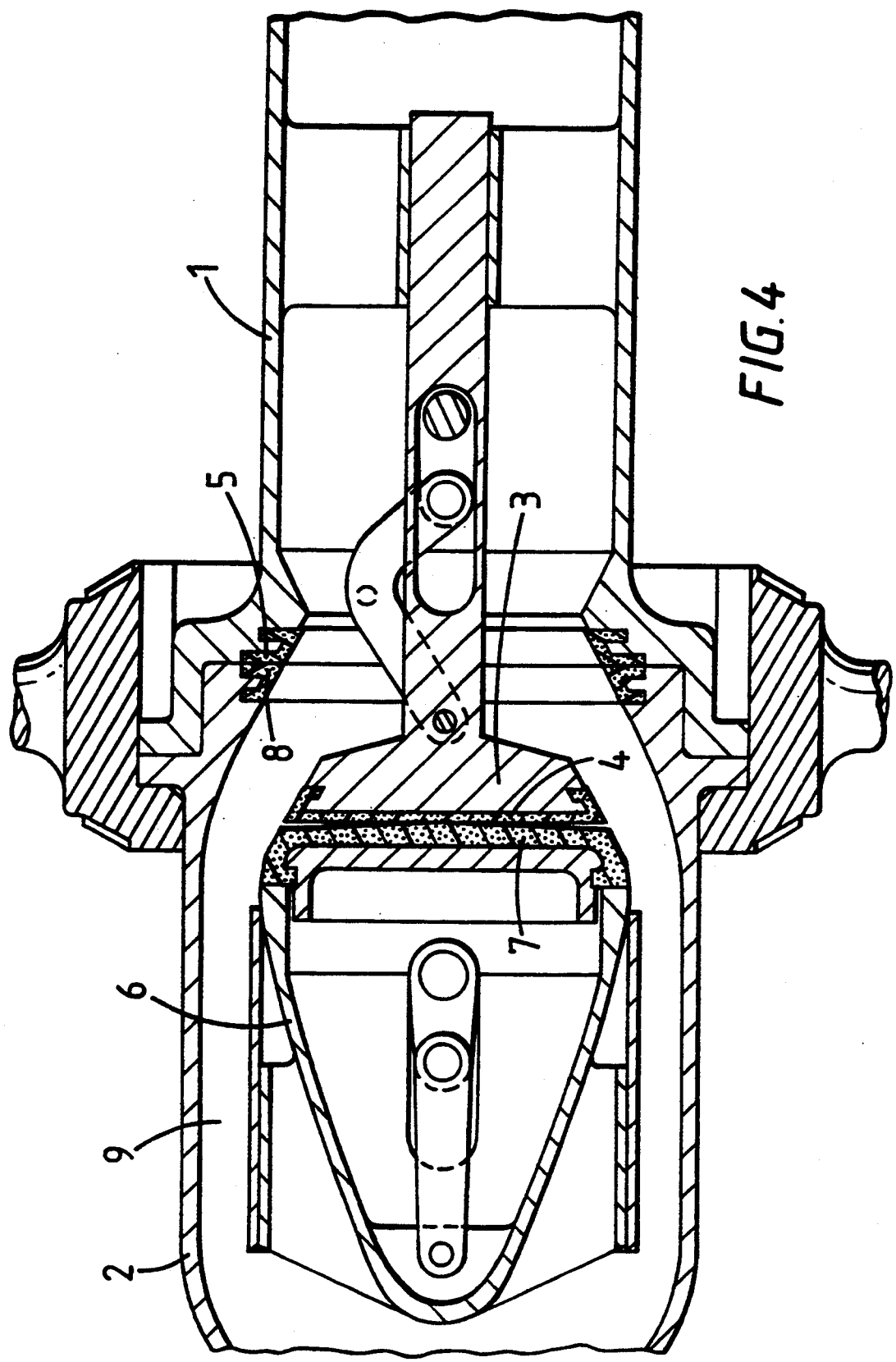
FIG. 4 shows the obturating members fully open with the ring seals compressed but the obturating member face seals relaxed.

FIG. 4 shows the coupling in the final stage of engagement with the tank connection obturating member 6 and the hose connection obturating member 3 drawn into rest positions in the tank connection body 2 and the coupling line formed by the two fluid passages fully open for fluid flow. The elastomeric material of the two obturating member face seals 4 and 7 is shown to be relaxed at this stage.

On disengaging the coupling, the initial movement is to revert from the condition shown in FIG. 4 to the condition shown in FIG. 3. In so doing, the obturating members 3 and 6 are first returned by the actuating means towards their respective ring seals 5 and 8 then, just before at least the larger obturating member 7 seats upon the larger diameter ring seal 8, the compression between the obturating member face seals 4 and 7 reoccurs by virtue of operation of the actuating means, again progressively closing the radial tapering clearance between the obturating member faces and forcing any fluid therebetween towards the interface between the tank connection obturating member face seal 7 and the tank connection ring seal 8. By virtue of the pressure differentials generated, as explained above, and an annular clearance between the obturating member 7 and the ring seal 8 which initially tapers towards the hose ring seal 5 and which is closed progressively in the upstream direction as the obturating member 7 seats in the ring seal 8, the displaced fluid will be forced back past the tank connection obturating member seal 7 and ring seal 8 into the tank connection fluid chamber 9.

In the concluding disengagement movement, the coupling mechanism brings the obturating member face seals 4 and 7 into pressure tight contact with their respective ring seals 5 and 8 before allowing the coupling parts to be disconnected. There would have been a similar tapering clearance between the hose connection obturating member 3 and its respective ring seal 5 which was also progressively closed in the upstream direction as the hose connection obturating member 3 seated which would have occurred before the tank connection obturating member 7 seated.

The ring seals and face seals may have any suitable form. For example, instead of the face seal 7 having a convex or conical face, it may be possible to use a face seal having a concave/conical depression so that the radially tapering cavity would diverge towards the axis, a vent being provided in the region of the centre of the respective obturating member to provide an escape path for fluid trapped between the mating faces of the obturating member face seals as it is squeezed out therebetween. Both the face seals may be profiled.

I claim:

1. A coupling for connecting together two fluid passages and through which fluid is to be transferred from one of the passages to the other, the coupling being of the kind which comprises two coupling parts each of which forms a respective one of the two fluid passages and is provided with an obturating member operable to close the respective fluid passage automatically, in a fluid tight manner, when the respective coupling part is disconnected from a mating coupling part, actuating means operable to effect decoupling and fluid tight coupling of the two coupling parts and to apply a thrust to said obturating members during coupling, so that the obturating members are displaced from their positions in which they close the respective through passages to allow fluid flow around the displaced obturating members from one passage to the other, and to return the obturating members to said positions for decoupling, wherein one of the obturating members has a face which is adjacent to a corresponding face of the other obturating member as those obturating members are displaced from said positions by said actuating means when the coupling parts are coupled together, wherein the improvement comprises said face of said one obturating member being formed of an elastomeric material and being profiled in its natural relaxed state such that, when it touches the adjacent face of the other obturating member without deformation of the elastomeric material, a radially extending tapering clearance is formed between those faces, said actuating means being adapted to apply an axial thrust through one of the obturating members to the other whereby the elastomeric material is compressed so that the clearance is taken up and fluid between those faces is squeezed out as the obturating members return to said positions prior to disconnection of the coupling parts, the elastomeric material of said one obturating member being in its natural relaxed state when the coupling parts have been coupled together and the obturating members have been displaced by said actuating means to rest positions which they occupy as fluid is transferred around them from one of the through passages to the other.

2. A coupling according to claim 1 comprising a pair of ring seals on a peripheral joint of the coupling parts and a pair of disc seals on the adjacent faces of the obturating members.

3. A coupling according to claim 2, wherein the profiles of said seals are so arranged that, in the purging sequence of the seal operation during which the profiled elastomeric material of one of the disc seals is deformed to squeeze out fluid from between the adjacent faces of the disc seals, annular clearances between the obturating members and the ring seals are progressively closed forcing any such residual fluid back past one of the two disc seals and into one of the two through passages before seating of the disc seals is completed prior to disconnection of the coupling.

4. A coupling according to claim 1, wherein the profile of said one obturating face seal is convex.

5. A coupling according to claim 1, wherein the profile of said one obturating face seal is conical.

6. A coupling according to claim 1, wherein both obturating member face seals are profiled.

7. A coupling according to claim 2 wherein each ring seal protrudes with respect to the respective face seal when the coupling parts are disconnected so that, upon engagement of the coupling, the ring seals come into pressure tight contact before the obturating member face seals contact.

8. A coupling according to claim 2 wherein the geometry of the coupling is arranged so that, when the coupling parts are engaged, the pressure between the ring seals is greater than the pressure between the face seals which in turn is greater than the fluid pressure upstream of the ring seals.

9. A coupling according to claim 3, wherein the profile of said one obturating face seal is convex.

10. A coupling according to claim 3, wherein the profile of said one obturating face seal is conical.

11. A coupling according to claim 3, wherein both obturating member face seals are profiled.

12. A coupling according to claim 3 wherein each ring seal protrudes with respect to the respective face seal when the coupling parts are disconnected so that, upon engagement of the coupling, the ring seals come into pressure tight contact before the obturating member face seals contact.

13. A coupling according to claim 3 wherein the geometry of the coupling is arranged so that, when the coupling parts are engaged, the pressure between the ring seals is greater than the pressure between the face seals which in turn is greater than the fluid pressure upstream of the ring seals.

14. A coupling according to claim 7, wherein the geometry of the coupling is arranged so that, when the coupling parts are engaged, the pressure between the ring seals is greater than the pressure between the face seals which in turn is greater than the fluid pressure upstream of the ring seals.

15. A coupling according to claim 9 wherein each ring seal protrudes with respect to the respective face seal when the coupling parts are disconnected so that, upon engagement of the coupling, the ring seals come into pressure tight contact before the obturating member face seals contact.

16. A coupling according to claim 9 wherein the geometry of the coupling is arranged so that, when the coupling parts are engaged, the pressure between the ring seals is greater than the pressure between the face seals which in turn is greater than the fluid pressure upstream of the ring seals.

17. A coupling according to claim 10 wherein each ring seal protrudes with respect to the respective face seal when the coupling parts are disconnected so that, upon engagement of the coupling, the ring seals come into pressure tight contact before the obturating member face seals contact.

18. A coupling according to claim 10 wherein the geometry of the coupling is arranged so that, when the coupling parts are engaged, the pressure between the ring seals is greater than the pressure between the face seals which in turn is greater than the fluid pressure upstream of the ring seals.

19. A coupling according to claim 11 wherein each ring seal protrudes with respect to the respective face seal when the coupling parts are disconnected so that, upon engagement of the coupling, the ring seals come into pressure tight contact before the obturating member face seals contact.

20. A coupling according to claim 11 wherein the geometry of the coupling is arranged so that, when the coupling parts are engaged, the pressure between the ring seals is greater than the pressure between the face seals which in turn is greater than the fluid pressure upstream of the ring seals.

* * * * *